(12) United States Patent
Sano et al.

(10) Patent No.: US 8,304,686 B2
(45) Date of Patent: Nov. 6, 2012

(54) LASER SHOCK HARDENING METHOD AND APPARATUS

(75) Inventors: Yuji Sano, Yokosuka (JP); Naruhiko Mukai, Yokohama (JP); Masaki Yoda, Yokohama (JP); Yoshiaki Ono, Kawasaki (JP); Ryoichi Saeki, Chigasaki (JP); Hideki Naito, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 163 days.

(21) Appl. No.: 12/724,953

(22) Filed: Mar. 16, 2010

(65) Prior Publication Data

US 2010/0170877 A1 Jul. 8, 2010

Related U.S. Application Data

(62) Division of application No. 11/431,920, filed on May 11, 2006.

(51) Int. Cl.
*B23K 26/00* (2006.01)
*B23K 26/12* (2006.01)
*C21D 7/06* (2006.01)
*B23K 26/18* (2006.01)

(52) U.S. Cl. .............. 219/121.61; 219/121.85; 148/525; 148/565

(58) Field of Classification Search .......... 219/121.65–121.69, 121.72, 121.61, 219/121.85; 148/512, 525, 565
See application file for complete search history.

(56) References Cited

U.S. PATENT DOCUMENTS

| | | | |
|---|---|---|---|
| 3,821,510 A | 6/1974 | Muncheryan | |
| 3,995,934 A | 12/1976 | Nath | |
| 4,592,353 A | 6/1986 | Daikuzono | |
| 4,766,009 A | 8/1988 | Imura et al. | |
| 5,057,104 A | 10/1991 | Chess | |
| 5,085,658 A | 2/1992 | Meyer | |
| 5,248,456 A | 9/1993 | Evans, Jr. et al. | |
| 5,492,447 A | 2/1996 | Mannava et al. | |
| 5,744,781 A | 4/1998 | Yeaton | |

(Continued)

FOREIGN PATENT DOCUMENTS

EP 0 416 988 A1 3/1991

(Continued)

OTHER PUBLICATIONS

Y. Sano, U.S. PTO Office Action, U.S. Appl. No. 11/431,920, dated May 25, 2010, 10 pages.

(Continued)

*Primary Examiner* — Samuel M. Heinrich
(74) *Attorney, Agent, or Firm* — Foley & Lardner LLP

(57) ABSTRACT

There is provided an improved laser shock hardening method and apparatus which can eliminate spattering of a liquid and waving of the liquid surface upon laser irradiation, and can stably irradiate a workpiece with a laser beam. Thus, the present invention provides in a laser shock hardening method for carrying out surface processing of a workpiece in contact with a liquid by irradiating through the liquid the surface of the workpiece with a pulsed laser beam intermittently emitted from a laser irradiation device, the improvement comprising: providing a solid transparent to the wavelength of the laser, serving as an entrance window to the surface of the liquid; allowing the liquid to be present in the light path of the laser beam between the solid and the surface of the workpiece; and allowing the laser beam to enter through the solid and irradiating through the liquid the surface of the workpiece with the laser beam, thereby shock-hardening the surface of the workpiece.

2 Claims, 11 Drawing Sheets

U.S. PATENT DOCUMENTS

| | | | |
|---|---|---|---|
| 5,762,493 A | 6/1998 | Rechmann | |
| 5,790,620 A * | 8/1998 | Okazaki et al. | 376/305 |
| 5,932,120 A * | 8/1999 | Mannava et al. | 219/121.85 |
| 6,294,225 B1 * | 9/2001 | McCay et al. | 427/554 |
| 6,479,790 B1 | 11/2002 | Graham et al. | |
| 6,541,733 B1 | 4/2003 | Mannava et al. | |
| 6,607,524 B1 | 8/2003 | LaBudde et al. | |
| 6,670,578 B2 | 12/2003 | Hackel et al. | |
| 6,969,821 B2 * | 11/2005 | Mika et al. | 219/121.83 |
| 7,211,763 B2 | 5/2007 | Zhang | |
| 7,304,266 B2 | 12/2007 | Mannava et al. | |
| 7,718,921 B2 | 5/2010 | Dane et al. | |
| 2003/0042235 A1 | 3/2003 | Suh et al. | |
| 2005/0213022 A1 * | 9/2005 | Kawada | 349/192 |
| 2007/0193990 A1 | 8/2007 | Richerzhagen et al. | |
| 2007/0243071 A1 | 10/2007 | Mannava et al. | |
| 2009/0045177 A1 | 2/2009 | Koseki et al. | |

FOREIGN PATENT DOCUMENTS

| | | |
|---|---|---|
| EP | 1 288 317 A1 | 3/2003 |
| EP | 1 598 140 A1 | 11/2005 |
| EP | 1 667 311 A1 | 6/2006 |
| JP | 63-33189 A | 2/1988 |
| JP | 02-047221 A | 2/1990 |
| JP | 03-099790 A | 4/1991 |
| JP | 04-127254 U | 11/1992 |
| JP | 06-031479 A | 2/1994 |
| JP | 07-246483 A | 9/1995 |
| JP | 07-256479 A | 10/1995 |
| JP | 08-112681 A | 5/1996 |
| JP | 08-206869 A | 8/1996 |
| JP | 08-326502 A | 12/1996 |
| JP | 09-264102 A | 10/1997 |
| JP | 2003-504212 A | 2/2003 |
| WO | WO 2005/031946 A1 | 4/2005 |

OTHER PUBLICATIONS

Y. Sano, U.S. PTO Final Office Action, U.S. Appl. No. 11/431,920, dated Nov. 16, 2010, 7 pages.

English Translation of "Metal Fatigue and Shot Peening", edited by Society of Shot Peening Technology of Japan.

Y. Sano, U.S. PTO Notice of Allowance, U.S. Appl. No. 11/431,920, dated Aug. 14, 2012, 10 pages.

* cited by examiner

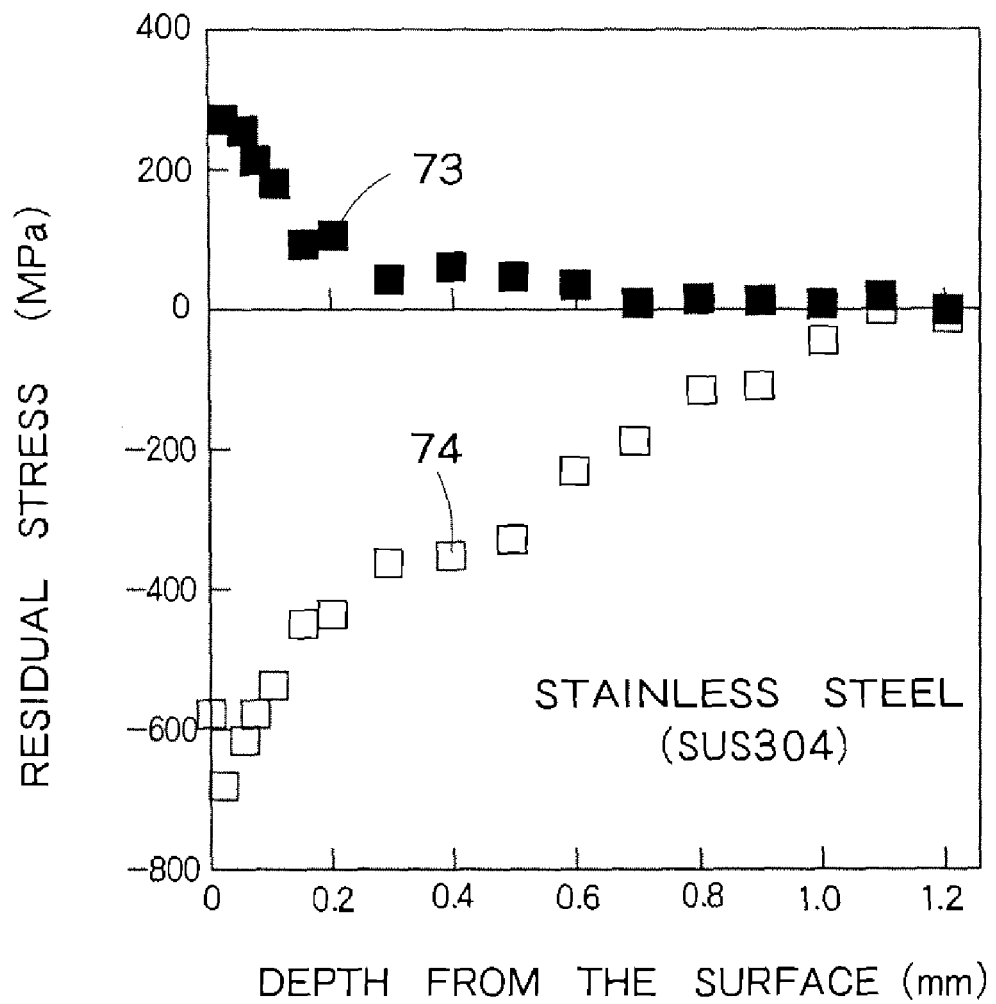
F I G. 3

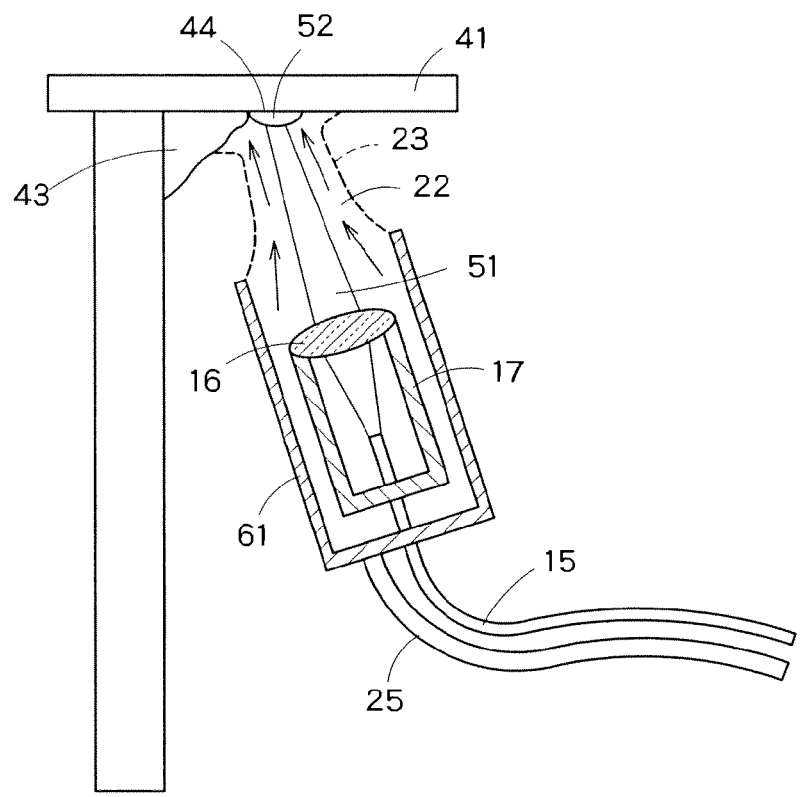
F I G. 5
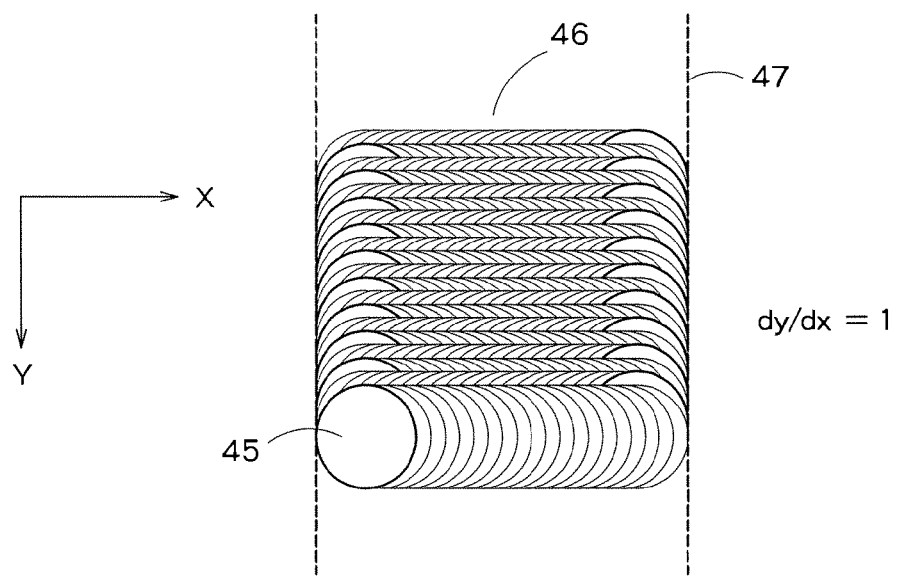
F I G. 6

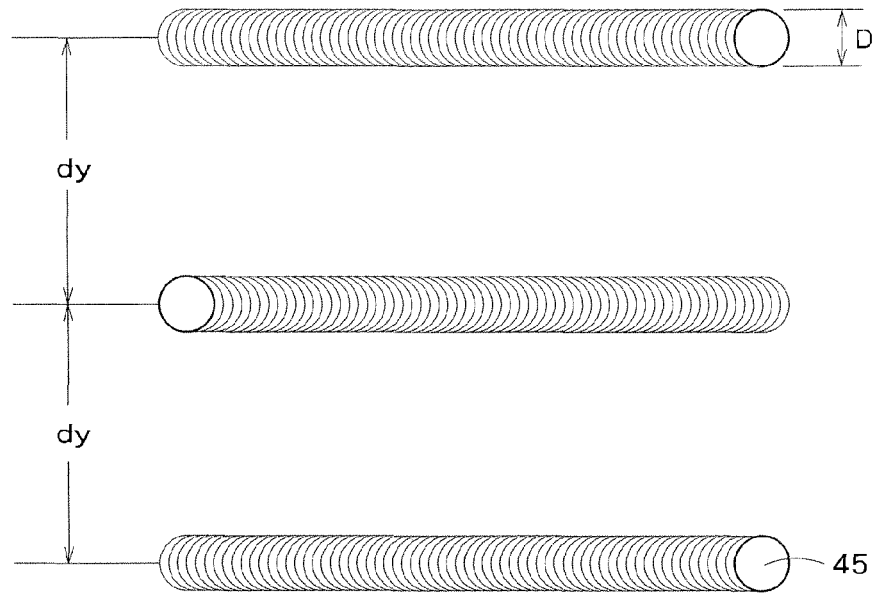
F I G. 9
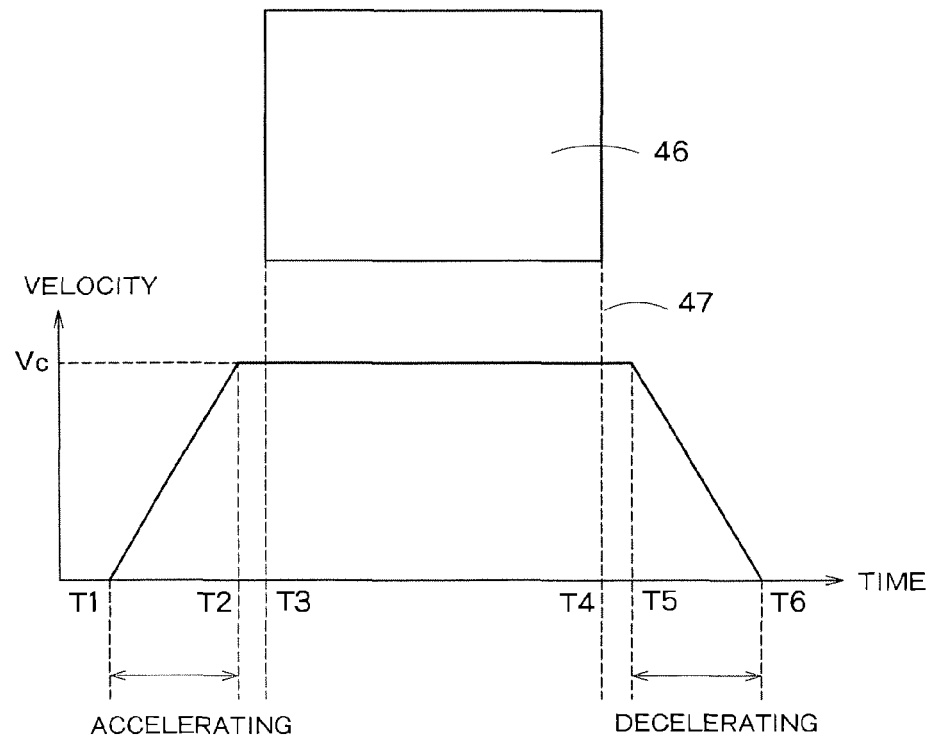
F I G. 10

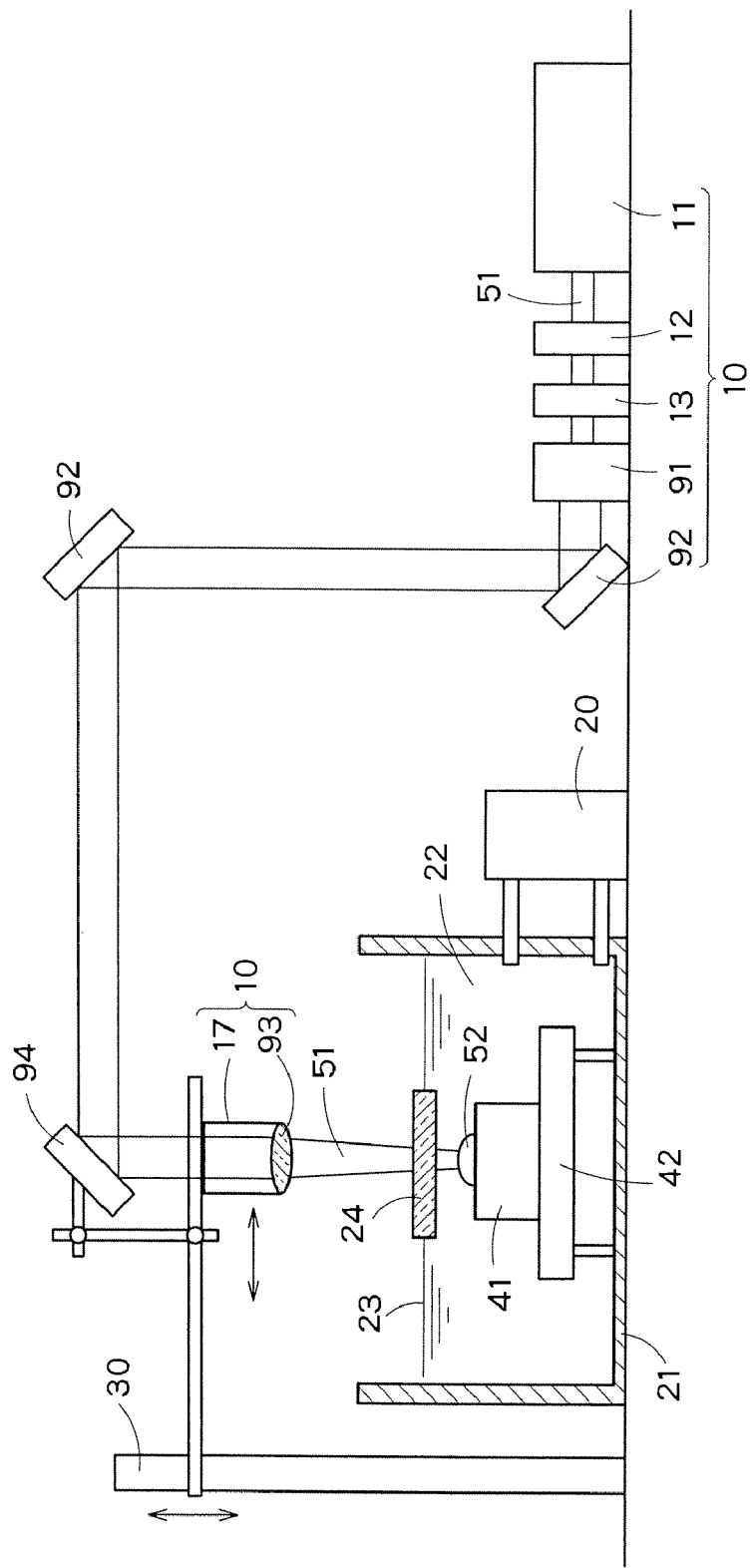
F I G. 13

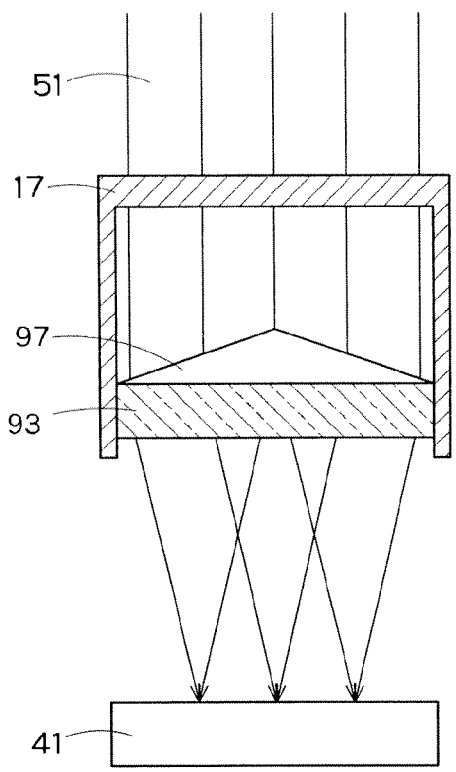
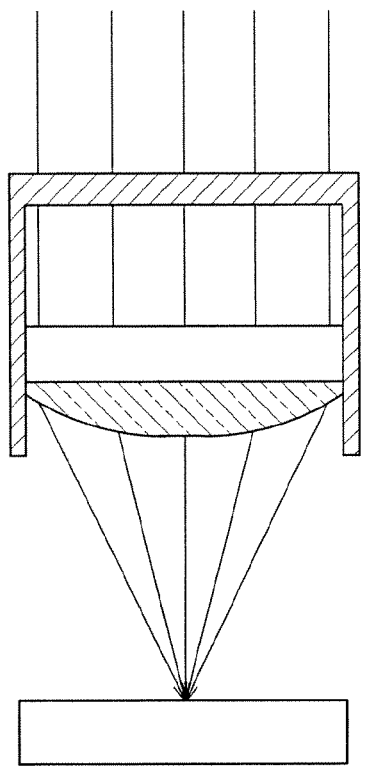
F I G. 16A    F I G. 16B
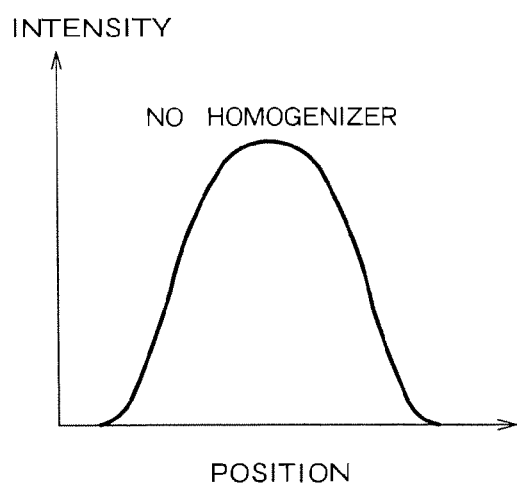
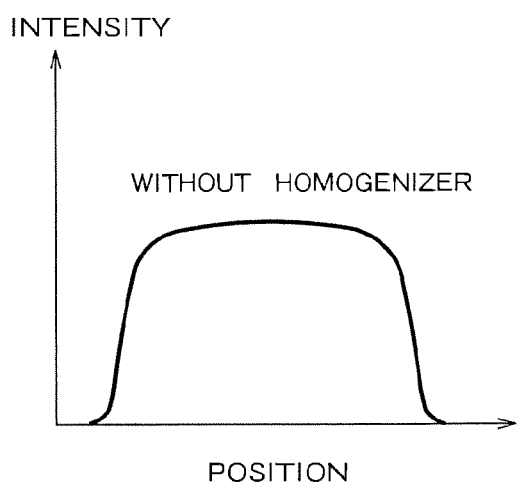
F I G. 17A    F I G. 17B

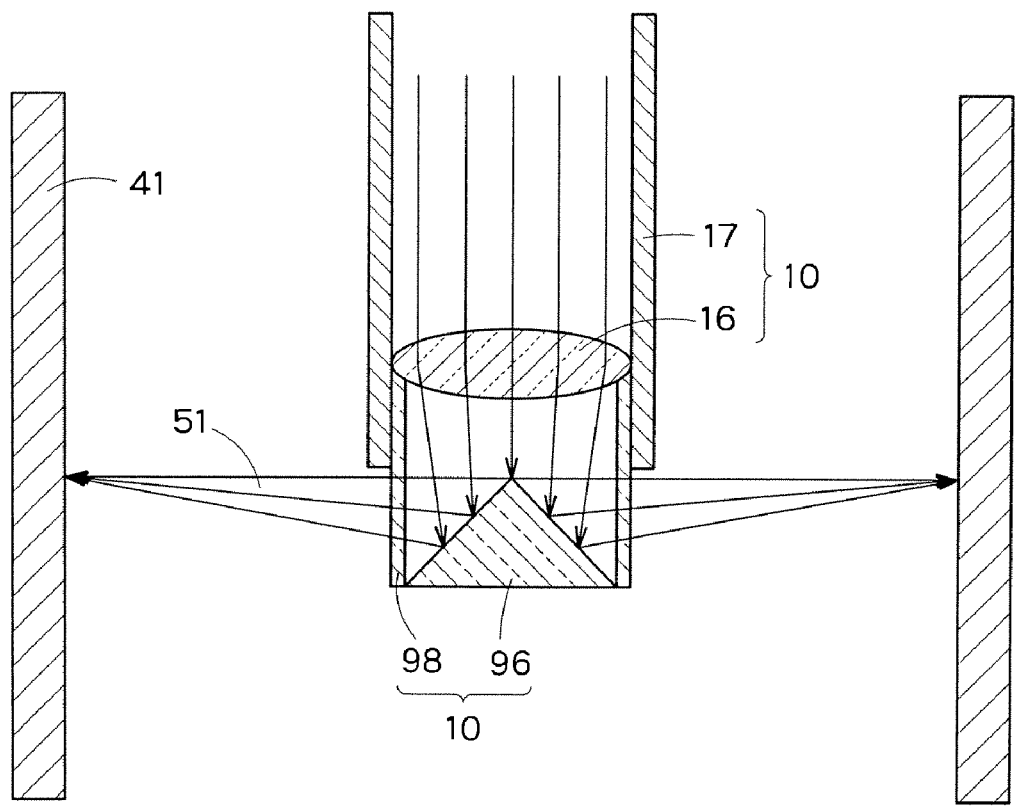
F I G. 18

LASER SHOCK HARDENING METHOD AND APPARATUS

CROSS REFERENCES TO RELATED APPLICATIONS

The present application is a Divisional of U.S. application Ser. No. 11/431,920, filed May 11, 2006, the entire contents of which are incorporated herein by reference.

BACKGROUND OF THE INVENTION

1. Field of the Invention

The present invention relates to a laser shock hardening method and apparatus for irradiating the surface of a solid material, such as a metal or a ceramic, with a pulsed laser beam through a liquid to adjust surface or internal characteristics of the material, such as structure, hardness and residual stress.

2. Background Art

Defects in a structure, such as corrosion and cracks, in most cases originate from the surface, and the life of the structure depends on its surface characteristics. Attempts have therefore been made to improve the mechanical or chemical properties of the surface of a material, such as fatigue strength, corrosion resistance and wear resistance, thereby prolonging the life of the structure.

Shot peening is a typical surface processing technique. This technique enables a rise in the hardness of a surface layer of a workpiece and introduction of compressive residual stress into the surface layer, and therefore is widely used in the industrial fields of automobiles, aircrafts, etc. (see, for example, "Metal Fatigue and Shot Peening", edited by Society of Shot Peening Technology of Japan).

Laser irradiation, on the other hand, enables precise and high-speed control of energy density and irradiation point and can carry out high-speed processing, rapid heating/quenching processing, etc. which are difficult with other methods. Accordingly, various laser irradiation techniques have been developed which find wider application to processing of materials.

One such technique is laser shock hardening which involves irradiation of the surface of a material with a pulsed laser beam through a liquid. As with shot peening, this technique enables a rise in the hardness of a surface layer of a workpiece and introduction of compressive residual stress into the surface layer.

Laser shock hardening has a higher effect than shot peening and, in addition, has various excellent advantages that shot peening does not have, such as capability of contactless operation, no involvement of reaction force and capability of precise control of laser irradiation conditions and laser irradiation sites. Development and practical application of this processing method are now under way (Japanese Patent Laid-Open Publications Nos. 7-246483, 8-112681, 8-326502, and 2003-504212).

Laser shock hardening, which involves irradiating the surface of a solid material, such as a metal or a ceramic, with a pulsed laser beam through a liquid to adjust surface of internal characteristics of the material, such as structure, hardness and residual stress, will now be described with reference to FIGS. 1 through 3.

FIG. 1 illustrates a method in which a workpiece 41 disposed in a liquid 22 is irradiated with a pulsed laser beam 51 to adjust the material characteristics, such as structure, hardness and residual stress, of the workpiece 41.

When the peak power density of the laser beam 51 exceeds the plasma generation threshold of the workpiece 41 (approximately 0.1 to 10 TW/m$^2$ in the case of a metal), the topmost surface layer (1 μm or lower) of the workpiece 41 evaporates instantly to generate a plasma 52. Because of inertia strongly acting instantaneously in the liquid 22, the plasma 52 can little expand and the energy of laser beam 51 concentrates in a narrow area. Accordingly, the pressure of the plasma can even reach 10-100 times the pressure in the air or in vacuum.

When water is used as the liquid 22, the pressure P (GPa) of the plasma generated is approximately equal to $(0.2 \times I)^{0.5}$, wherein I (TW/m$^2$) represents the peak power density of the laser beam 51 applied to the workpiece 41. In case the liquid 22 is a liquid other than water, such as an alcohol, ammonia water or a boric acid solution, the plasma pressure can be determined by the equation: $P=(0.2 \times I \times k)^{0.5}$, k=(acoustic impedance of liquid)/(acoustic impedance of water)

The "acoustic impedance of liquid" is equal to (density of liquid)×(sonic velocity in liquid). With the above-described liquid other than water, therefore, the plasma pressure in the liquid does not differ significantly from that in water. Thus, in either case, when the size and the pulse energy of the laser beam 51 are so controlled as to make the peak power density of the laser beam 51 1-100 TW/m$^2$ at the surface of the workpiece 41, the pressure of the plasma 52 will be approximately 450 MPa-4.5 GPa.

The high-pressure plasma 52 thus generated instantaneously compresses the surface of the workpiece 41 and the surface displacement caused by the compression generates a shock wave 53 that propagates in the depth direction of the workpiece. The shock wave 53, when its pressure exceeds the yield stress of the workpiece, will cause a local plastic deformation. This makes it possible to adjust the material characteristics, such as structure, hardness and residual yield.

FIGS. 2 and 3 illustrate an example of adjustment of material characteristics by laser shock hardening, FIG. 2 showing a change in the hardness of a stainless steel (SUS 304) and FIG. 3 showing a change in the residual stress of the stainless steel. A laser beam of a pulse energy of 200 mJ and a pulse width of 8 ns was collected such that the irradiation spot takes the shape of a circle having a diameter of 0.8 mm and was applied at 36 pulses per 1 mm$^2$, so that the peak power density became 50 TW/m$^2$. Reference numerals 71, 72 denote the hardness values before and after processing. The comparative data shows a rise in the hardness in the region nearly to the depth of 1 mm by the laser shock hardening processing. Reference numerals 73, 74 denote the residual stress values before and after processing. The comparative data shows an improvement from tensile to compressive in the residual stress in the region nearly to the depth of 1 mm by the laser shock hardening processing.

Such a rise in the hardness of the surface of a material and the formation of a compressive residual stress are effective in enhancing fatigue strength and preventing stress corrosion cracking. Therefore, laser shock hardening has been progressively employed in the aircraft industry, the automobile industry, the atomic industry, etc.

Since laser shock hardening involves direct irradiation of the surface of the workpiece 41 with the pulsed laser beam 51, there is a case where an element, constituting the liquid 22 decomposed by the plasma 52, reacts with the surface of the workpiece 41.

For example, in the case of laser shock-hardening a stainless steel in a water atmosphere, hydrogen and oxygen are generated by the decomposition of water, and the oxygen reacts with the surface of the stainless steel, whereby a strong black oxide film having a thickness of about 1 µm, composed mainly of $Fe_3O_4$, is formed on the surface after the processing.

In case such a black film is undesirable for its appearance, a coating film having a thickness of the order of several tens of µm may be formed on the surface of the workpiece 41, for example with a paint or a metal tape, prior to laser shock hardening. After removing the coating film, the surface state of the workpiece 41 will be almost the same as that before the processing.

In laser shock hardening, the surface of a material is irradiated with a pulsed laser beam through a liquid, such as water. Upon irradiation with a laser beam, there occurs the phenomenon that a high-pressure plasma, generated on the surface of the material, spatters the liquid and disturbs the liquid surface. When irradiation with the next laser beam is carried out shortly thereafter, the position or the shape of the irradiation spot can change due to refraction. The next laser beam irradiation should therefore be awaited until the disturbance of the liquid surface settles down, which precludes speeding up of the processing.

Further, laser shock hardening is generally carried out by applying a pulsed laser beam, shaped into a circular or square shape of a size of about 1 to several mm, to the surface of a material. Laser shock hardening thus has the drawback that only a small area can be processed with one pulse, that is, the processing speed is low. Studies have therefore been made on methods for speeding up of processing, for example, the use of a laser oscillator with a high repetition or the use of a laser oscillator with a large pulse energy. Such speeding-up methods, however, entail such problems as the necessity of using a larger-sized laser oscillator or a larger-sized driving device for moving a workpiece or an irradiation head. Speeding up of laser shock hardening processing has thus been difficult.

SUMMARY OF THE INVENTION

The present invention has been made in order to solve the above problems in the prior art. It is therefore an object of the present invention to provide a laser shock hardening method and apparatus which enables a rise in the hardness of the surface of a workpiece and an improvement in residual stress in the surface, can eliminate spattering of a liquid and waving of the liquid surface upon laser irradiation, and can stably irradiate the workpiece with a laser beam.

It is also an object of the present invention to provide a laser shock hardening method and apparatus which makes it possible to process a workpiece at a sufficiently high speed without imposing an excessive burden on a driving device.

In order to achieve the above objects, the present invention provides in a laser shock hardening method for carrying out surface processing of a workpiece in contact with a liquid by irradiating through the liquid the surface of the workpiece with a pulsed laser beam intermittently emitted from a laser irradiation device, the improvement comprising: providing a solid transparent to the wavelength of the laser, serving as an entrance window to the surface of the liquid; allowing the liquid to be present in the light path of the laser beam between the solid and the surface of the workpiece; and allowing the laser beam to enter through the solid and irradiating through the liquid the surface of the workpiece with the laser beam, thereby shock-hardening the surface of the workpiece.

The present invention also provides in a laser shock hardening method for carrying out surface processing of a workpiece in contact with a liquid by irradiating through the liquid the surface of the workpiece with a pulsed laser beam intermittently emitted from a laser irradiation device, the improvement comprising: filling the light path of the laser from the laser exit of the laser irradiation device to the surface of the workpiece with a liquid transparent to the wavelength of the irradiating laser; and irradiating through the liquid the surface of the workpiece with the laser beam, thereby shock-hardening the surface of the workpiece.

The present invention also provides in a laser shock hardening method for carrying out surface processing of a workpiece in contact with a liquid by irradiating through the liquid the surface of the workpiece with a pulsed laser beam intermittently emitted from a laser irradiation device, the improvement comprising: setting a velocity of relative movement between the laser beam and the workpiece so that the irradiation interval of the laser beam applied to the surface of the workpiece differs between the direction of the relative movement between the workpiece and the laser beam and the direction perpendicular to the relative movement direction; irradiating through the liquid the surface of the workpiece with the laser beam emitted from the laser irradiation device; and moving the workpiece and the laser beam relative to each other at the set relative movement velocity, thereby shock-hardening the surface of the workpiece.

Preferably, the irradiation interval of the laser beam applied to the surface of the workpiece is smaller in the direction of the relative movement between the workpiece and the laser beam than in the direction perpendicular to the relative movement direction. Further, the irradiation interval of the laser beam in the direction perpendicular to the direction of the relative movement between the workpiece and the laser beam is preferably not more than 5 times the size of the irradiation spot of the laser beam.

The present invention also provides in a laser shock hardening method for carrying out surface processing of a workpiece in contact with a liquid by irradiating through the liquid the surface of the workpiece with a pulsed laser beam intermittently emitted from a laser irradiation device, the improvement comprising: forming the laser beam emitted from the laser irradiation device in such a cross-sectional shape that a laser beam irradiation spot on the surface of the workpiece takes an elongate shape; irradiating through the liquid the surface of the workpiece with the elongate irradiation spot; and moving the workpiece and the laser beam relative to each other, thereby shock-hardening the surface of the workpiece.

Preferably, the laser beam irradiation spot has an elliptical or rectangular shape.

The present invention also provides in a laser shock hardening method for carrying out surface processing of a workpiece in contact with a liquid by irradiating through the liquid the surface of the workpiece with a pulsed laser beam intermittently emitted from a laser irradiation device, the improvement comprising: positioning a tubular workpiece coaxially with the light axis of the laser beam; forming the laser beam emitted from the laser irradiation device in such a cross-sectional shape that a laser beam irradiation spot on the inner peripheral surface of the workpiece takes the shape of a narrow ring; irradiating through the liquid the inner peripheral surface of the workpiece with the narrow ring-shaped irradiation spot; and moving the workpiece and the laser beam relative to each other in the axial direction of the workpiece, thereby shock-hardening the inner peripheral surface of the workpiece.

The present invention also provides a laser shock hardening apparatus comprising: a laser irradiation device including a laser oscillator and an optical device for directing a laser beam, emitted from the laser oscillator, to the surface of a workpiece; a driving device for moving the laser beam relative to the workpiece along the surface of the workpiece; a solid member transparent to the wavelength of the laser, disposed at a position distant from the surface of the workpiece and serving as an entrance window to a liquid surface; and a vessel for filling the light path of the laser beam between the solid member and the surface of the workpiece with a liquid.

The present invention also provides a laser shock hardening apparatus comprising: a laser irradiation device including a laser oscillator and an optical device for directing a laser beam, emitted from the laser oscillator, to the surface of a workpiece; a driving device for moving the laser beam relative to the workpiece along the surface of the workpiece; and a liquid jet nozzle, provided at the laser exit of the laser irradiation device, for jetting a liquid transparent to the wavelength of the irradiating laser coaxially with the laser beam so as to fill the light path of the laser from the laser exit to the surface of the workpiece with the liquid.

The above laser shock hardening apparatuses may each further comprise a means for controlling the velocity of the relative movement between the laser beam and the workpiece so that the irradiation interval of the laser beam applied to the surface of the workpiece differs between the direction of the relative movement between the workpiece and the laser beam and the direction perpendicular to the relative movement direction.

In a preferred embodiment of the present invention, the optical device includes a means for forming the laser beam emitted from the laser irradiation device in such a cross-sectional shape that a laser beam irradiation spot on the surface of the workpiece takes an elongate shape. The optical device may include a cylindrical convex lens or a cylindrical concave mirror, and form the laser beam, coming out of the cylindrical convex lens or the cylindrical concave mirror, in an elliptical cross-sectional shape and apply the laser beam to the surface of the workpiece. Alternatively, the optical device may include a homogenizer for equalizing an intensity distribution in the laser beam, and a cylindrical convex lens or a cylindrical concave mirror, and form the laser beam, coming out of the cylindrical convex lens or the cylindrical concave mirror, in a rectangular cross-sectional shape and apply the laser beam to the surface of the workpiece.

In a preferred embodiment of the present invention, the optical device includes at the front end a rotationally-symmetrical mirror which reflects the incident laser beam which is generally parallel to the axis of symmetry of the mirror to form a radial laser beam. The rotationally-symmetrical mirror may be a conical mirror and used in combination with a convex lens or a concave mirror.

Preferably, the line of intersection of the reflecting surface of the rotationally-symmetrical mirror with a plane including the axis of symmetry of the mirror is part of a parabola, and the focus of the parabola lies approximately on the surface of the workpiece.

By providing a solid transparent to the wavelength of an irradiating laser at a distance from the surface of a workpiece and filling the light path of the laser between the solid and the surface of the workpiece with a liquid, according to the present invention, the liquid has no free surface in the light path of the laser. In principle, therefore, there is no possibility of sputtering of the liquid and waving of the liquid surface upon laser irradiation. It thus becomes possible to stably irradiate a predetermined point with a laser beam and to increase the processing speed by using a laser oscillator with a higher repetition.

By filling the light path of an irradiating laser from the laser exit of a laser irradiation device to the surface of a workpiece with a liquid transparent to the wavelength of the laser, according to the present invention, the liquid has no free surface in the light path of the laser. In principle, therefore, there is no possibility of sputtering of the liquid and waving of the liquid surface upon laser irradiation. It thus becomes possible to stably irradiate a predetermined point with a laser beam and to increase the processing speed by using a laser oscillator with a higher repetition.

By providing a liquid jet nozzle at the laser exit of a laser irradiation device and jetting a liquid transparent to the wavelength of an irradiating laser coaxially with a laser beam so as to fill the light path of the laser from the laser exit to the surface of a workpiece with the liquid, according to the present invention, the liquid has no free surface in the light path of the laser. Accordingly, it becomes possible to stably irradiate a predetermined point with a laser beam and to increase the processing speed by using a laser oscillator with a higher repetition. Further, since the light path can be kept dean with the liquid jetted coaxially with the laser beam, there is no fear of scattering or absorption of laser by impurities. Furthermore, a processing product produced upon laser beam irradiation can be effectively removed by the jetted liquid. This makes it possible to apply laser pulses at a high repetition, thereby increasing the processing speed.

By making the irradiation interval of laser beam in the direction of relative movement between a workpiece and the laser beam smaller than that in the direction perpendicular to the relative movement direction, according to the present invention, it becomes possible to decrease the velocity of the relative movement between the workpiece and the laser beam, thus reducing the burden on the driving device. Accordingly, it becomes possible to apply laser pulses at a higher repetition with the same driving device used, thereby increasing the processing speed.

Furthermore, by forming a laser beam in such a cross-sectional shape that a laser beam irradiation spot on the surface of a workpiece takes an elongate shape, and moving the workpiece and the laser beam relative to each other in a direction generally perpendicular to the long direction of the elongate irradiation spot, according to the present invention, it becomes possible to decrease the velocity of the relative movement, thus reducing the burden on the driving device. Accordingly, it becomes possible to apply laser pulse at a higher repetition with the same driving device used, thereby increasing the processing speed.

BRIEF DESCRIPTION OF THE DRAWING

FIG. 3 is a graphical diagram showing a change in the residual stress of the stainless steel by laser shock hardening;

FIG. 5 is a cross-sectional diagram illustrating a laser shock hardening apparatus according to a second embodiment of the present invention;

FIG. 6 is a diagram illustrating a conventional manner of laser beam irradiation in laser shock hardening;

FIG. 9 is a diagram illustrating a yet another manner of laser irradiation according to the third embodiment of the present invention;

FIG. 10 is a graphical diagram showing the relationship between time and the moving velocity of a driving device;

FIG. 13 is a cross-sectional diagram illustrating a laser shock hardening apparatus according to a fifth embodiment of the present invention;

FIGS. 16A and 16B are cross-sectional diagrams illustrating an irradiation head using a homogenizer, and its function;

FIG. 17 is a graphical diagram illustrating the effect of a homogenizer on equalization of laser intensity distribution; and FIG. 18 is a cross-sectional diagram illustrating a laser shock hardening apparatus according to a sixth embodiment of the present invention.

DETAILED DESCRIPTION OF THE PREFERRED EMBODIMENTS

Preferred embodiments of the present invention will now be described with reference to the drawings.

<First Embodiment>

Figure 1:
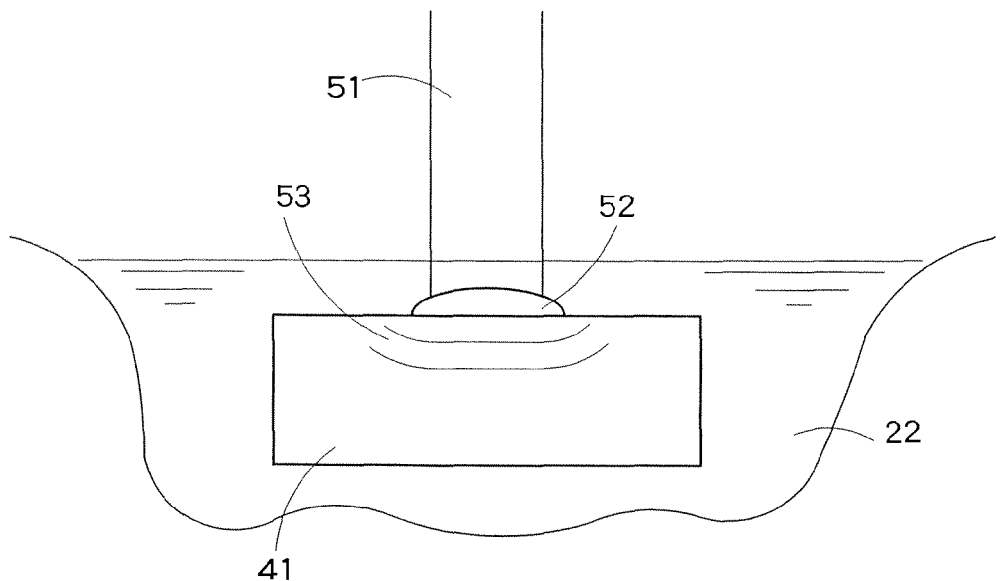
FIG. 1 is a conceptual diagram illustrating the principle of laser shock hardening.
Figure 2:
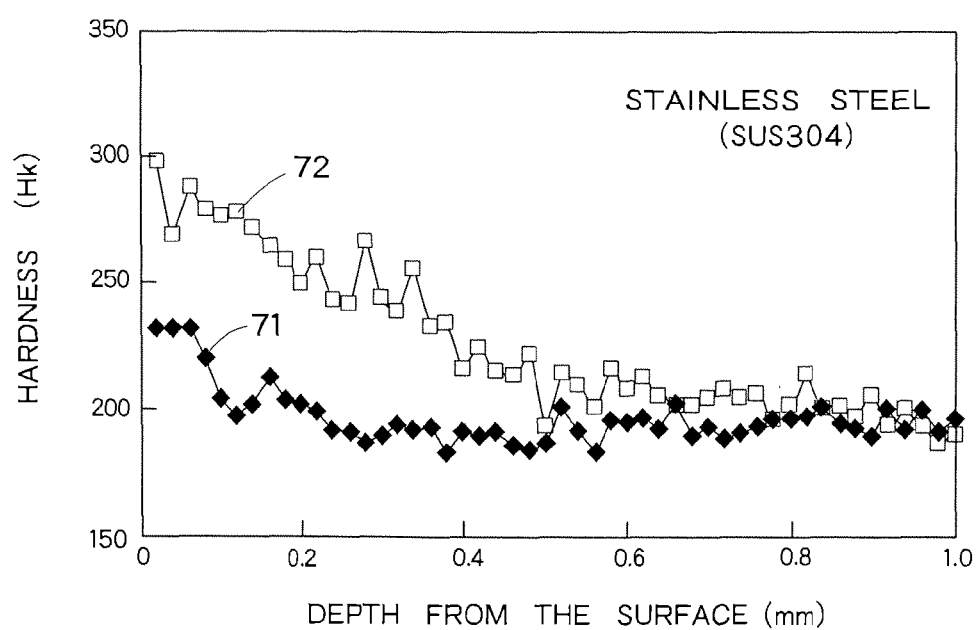
FIG. 2 is a graphical diagram showing a change in the hardness of a stainless steel by laser shock hardening.
Figure 4:
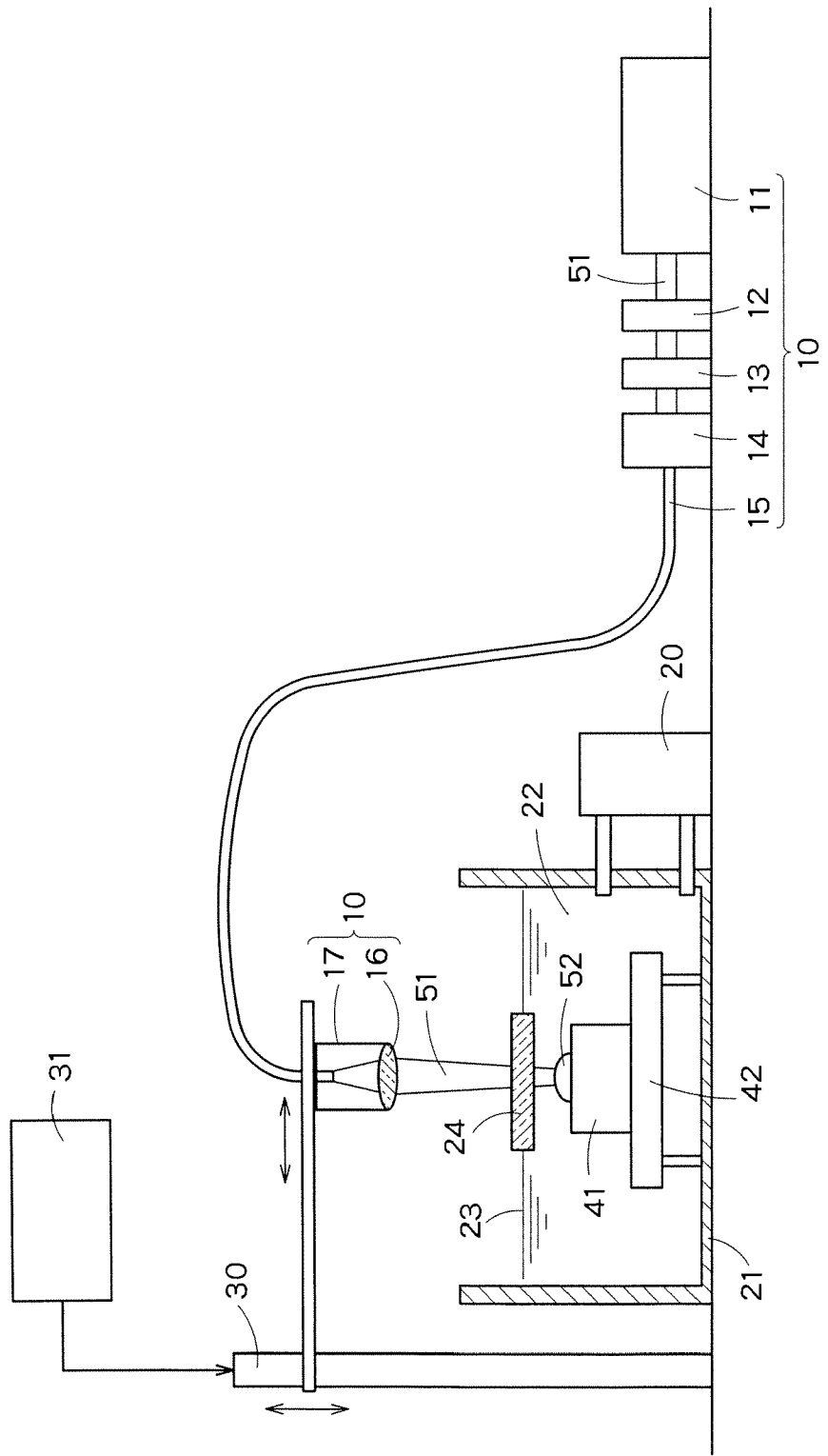
FIG. 4 is a cross-sectional diagram illustrating a laser shock hardening apparatus according to a first embodiment of the present invention.

FIG. 4 is an explanatory diagram illustrating a laser shock hardening method according to a first embodiment of the present invention. The same members or elements as those of FIG. 1 are designated with the same reference numerals, and a duplicate description thereof will be omitted.

A workpiece 41 is set on a holder 42 placed in a liquid 22 filled in a vessel 21. The holder 42, which fixes the workpiece 41, has a position adjustment function of adjusting the height, angle, etc. of the workpiece 42.

A pulsed laser beam 51, emitted from a laser oscillator 11, passes through a power adjustment device 12, a shutter 13 and an optical injection system 14 and enters an optical fiber 15. The laser beam 51 emerging from the optical fiber 15 is directed by an irradiation head 17 having a lens 16 toward the workpiece 41 in the liquid 22. While moving the irradiation head 17 along the surface of the workpiece 41 by means of a driving device 30, the laser beam 51 is intermittently applied to the workpiece 41, thereby uniformly shock-hardening a predetermined processing area of the surface of the workpiece 41.

A glass laser or a Nd:YAG laser, which oscillates at a near-infrared wavelength of about 1 μm, may be used for the laser oscillator 11. When water is used as the liquid 22, the depth of the workpiece 41 in water should be up to several mm because the near-infrared light is absorbable by water. However, in case the workpiece 41 has a complicated shape, it may be difficult to control its in-water depth within several mm. It is therefore preferred to use for the laser oscillator 11 the second harmonic wave of Nd:YAG laser (wavelength of 0.53 μm) which is little absorbed by water and thus is free of in-water depth limitation.

The power adjustment device 12 is an optical device which is comprised of, for example, a combination of a polarizing plate and a branching device, and which adjusts the energy of the laser beam 51. The shutter 13 is comprised of, for example, a high-speed operational mirror and is so designed that through opening/closing control in synchronization with the driving device 30, it allows the laser beam 51 to be applied only to a necessary portion of the surface of the workpiece 41. The optical injection system 14 adjusts and keeps the positional relationship between the laser beam 51 and the optical fiber 15 and, with the provision of a homogenizer or the like, also functions to flatten the in-beam spatial intensity distribution of the laser beam 51, thereby preventing damage to the laser inlet end of the optical fiber 15.

The irradiation head 17, provided with the lens 16, functions to direct the laser beam 51, emerging from the optical fiber 15, to the surface of the workpiece 41 while narrowing the laser beam 51. Accordingly, the area of the irradiation spot on the surface of the workpiece 41 can be changed and thus the peak power density ($I(TW/m^2)$) of the laser beam 51 applied to the surface of the workpiece 41 can be changed by changing the distance between the irradiation head 17 and the workpiece 41.

The effect of laser shock hardening is determined by the pressure of the plasma 52 ($P=(0.2 \times I)^{0.5}$). In order to ensure the effect, it is therefore necessary to keep the peak power density within a predetermined range. For this purpose, the holder 42 for holding the workpiece 41 has a position adjustment function, and makes a rough adjustment of the distance between the irradiation head 17 and the workpiece 41 by adjusting the position of the workpiece 41. By also controlling the height of the irradiation head 17 by means of the driving device 30, the distance between the irradiation head 17 and the workpiece 41 is kept within a predetermined range.

The height of the irradiation head 17 is controlled by measuring the distance between the irradiation head 17 and the workpiece 41 with a distance measuring device (not shown), such as an ultrasonic distance meter or a laser distance meter. The height of the irradiation head 17 can also be controlled by the arrival time of generated sound of the plasma 52 generated by irradiation with the laser beam 51. It is also possible to control the height of the irradiation head 17 by measuring through the optical fiber 15 the reflection intensity of the laser beam 51 reflected by the surface of the workpiece 41.

The plasma 52 generated by irradiation with the laser beam 51 loses its energy in a short time (about $10^{-7}$ second) and, as it is cooled, takes the form of fine particles which float in the liquid. If the next laser beam is applied to such a system, the fine particles will absorb or scatter the energy of the laser beam, precluding efficient laser shock hardening.

In this embodiment, in order to prevent floating of such fine particles, a liquid supply device 20 is connected to the vessel 21 so as to continually supply a fresh liquid 22 into the vessel 21. The liquid supply device 20 is comprised of, for example, a pump, a filter and a flow meter.

Further in this embodiment, a transparent window 24, serving as an entrance window to the liquid surface, is set at approximately the same level as the liquid surface 23. A material transparent to the wavelength of the laser used (i.e. little absorption of laser) suffices for the transparent window 24. For example, quarts glass or polycarbonate, having excellent durability, may be used. By thus setting the transparent window 24, the liquid 22 has no free surface in the light path of the laser beam 51. Accordingly, in principle, there is no possibility of the occurrence of disturbance of the liquid surface 23.

If the transparent window 24 is not provided and the laser beam 51 is allowed to enter through the free surface of the liquid 22, sputtering or waving of the liquid 22 due to the pressure of the plasma 52 (the peak pressure is about 3 GPa)

will occur and, because of refraction of the laser beam 51, the position or the shape of the irradiation spot will change. It is therefore necessary to await irradiation with the next laser beam 51 until the disturbance of the liquid surface 23 settles down. When, for example, using a vessel 21 of a size of 300 mm×400 mm×200 mm (depth), it takes about 10 seconds for the disturbance of the liquid surface 23 to settle down, precluding speeding up of the processing. The disturbance of the liquid surface 23 also entails the problem that the sputtered liquid 22 adheres to the lens 16 of the irradiation head 17 or other optical devices, causing refraction of the laser.

According to this embodiment, the provision of the transparent window 24 prevents disturbance of the liquid surface 23 and thus can eliminate the waiting time, making it possible to apply the puked laser beam 51 intermittently at short intervals. Accordingly, it becomes possible to increase the processing speed by using a laser oscillator 11 having a high repetition.

Though in this embodiment shown in FIG. 4 the transparent window 24 is provided such that it covers part of the liquid surface 23, it is also possible to cover the entire liquid surface 23 with the transparent window 24. Further, though the optical fiber 15 is used as a means for transmitting the laser beam 51, it is also possible to use an articulated flexible arm used e.g. in the field of dental care.

In this embodiment a predetermined area of the surface of the workpiece 41 is laser shock hardening-processed by moving the irradiation head 17. Needless to say, the same processing effect is achieved also in the case of moving the workpiece 41 while the irradiation head 17 is fixed or in the case of moving the irradiation 17 and the workpiece 41 simultaneously.

<Second Embodiment>

FIG. 5 is an explanatory diagram illustrating a laser shock hardening method and apparatus according to a second embodiment of the present invention. The same members or elements as those of the first embodiment are designated with the same reference numerals and a duplicate description thereof will be omitted.

The workpiece 41 in this embodiment is, unlike that of the first embodiment, a structure which cannot be placed in the liquid in the vessel 21 in carrying out laser shock hardening, for example, a bridge pier.

In the case where the workpiece 41 is a bridge pier, the laser beam 51 emitted from the irradiation head 17 is applied to a heat-affected zone around a weld zone 43 to adjust the material characteristics including residual stress.

To obtain the desired effect of laser shock hardening, the irradiation portion 44 needs to be covered with the liquid 22 when it is irradiated with the laser beam 51. However, in the case where the irradiation portion 44 is positioned on the lower side of the structure, as illustrated in FIG. 5, it is difficult with the conventional technique to hold the liquid 22 in such a manner that it covers the irradiation portion 44.

Even in such a case, it becomes possible with the present invention to cover the light path of the laser beam 51 and the irradiation portion 44 with the liquid 22 by jetting the liquid 22 from a liquid jet nozzle 61 coaxially with the laser beam 51, as shown in FIG. 5.

After irradiation with the laser beam 51, the pressure of the plasma 52 is transmitted through the liquid 22 to the liquid surface 23, causing sputtering of the liquid 22. For example, in the case where the thickness of the liquid 22 in the irradiation portion 44 is 1 mm, the liquid 22 begins to sputter about $10^{-6}$ second after irradiation with the laser beam 51 whereby part of the irradiation portion 44 becomes exposed temporarily. It is therefore necessary to re-cover the irradiation portion 44 with the liquid, e.g. by adjustment of the flow rate of the liquid 22, before irradiation with the next laser beam 51.

For the purpose of re-covering the irradiation portion 44 with the liquid 22 before irradiation with the next laser beam 51 to carry out the laser shock hardening processing more continually, an experiment was conducted with the size and the shape of the liquid jet nozzle 61 and the jet flow rate of the liquid 22 as parameters to examine the time from when the irradiation portion 44 becomes exposed upon irradiation with the laser beam till when the exposed irradiation portion 44 becomes re-covered with the liquid 22. The experiment was conducted by using various repetitions up to 300 Hz to examine a change in the effect of laser shock hardening with a change in the repetition.

It was confirmed from the results of the experiment that when the liquid 22 is allowed to flow coaxially with the laser beam 51 e.g. at a speed of 3 m/s and a flow rate of 4 liters/min, the exposed irradiation portion 44 becomes re-covered with the liquid 22 about $10^{-3}$ second after its exposure. It was also confirmed that an increase in the repetition of laser oscillation up to a high repetition of 300 Hz produces no significant difference in the effect of laser shock hardening.

while it has been confirmed experimentally that the same laser shock hardening effect can be obtained with a repetition of laser oscillation up to 300 Hz by allowing the liquid 22 to flow coaxially with the laser beam 51 at a speed of 3 m/s, as described above, it is calculatively possible to increase the repetition of laser oscillation up to about 1 kHz, thereby speeding up the processing. However, because of the fact that a pulsed-oscillation high-power laser currently available commercially has a repetition of 100 Hz at most, the 3 m/s flow speed of the liquid 22 suffices. Even when a laser oscillator that oscillates at a higher speed is developed by technological innovation in the future, the same laser shock hardening effect will be obtained by increasing the flow speed and the flow rate of the liquid 22.

In order to correctly apply the laser beam 51 to the irradiation portion 44, it is important to avoid generation of a gas phase, such as air bubbles, in the liquid 22. For this purpose, it is necessary to control the flow speed and the flow rate of the liquid 22 to prevent the liquid 22 jetted coaxially with the laser beam 51 from taking a negative pressure and causing cavitation before reaching the irradiation portion 44.

<Third Embodiment>

FIGS. 6 through 11 are explanatory diagrams illustrating a laser shock hardening method according to a third embodiment of the present inventions. The apparatus shown in FIG. 4 can be used for the laser shock hardening method of this embodiment. Thus, the same members or elements as those of the first embodiment are designated with the same reference numerals and a duplicate description thereof will be omitted.

Figure 7:
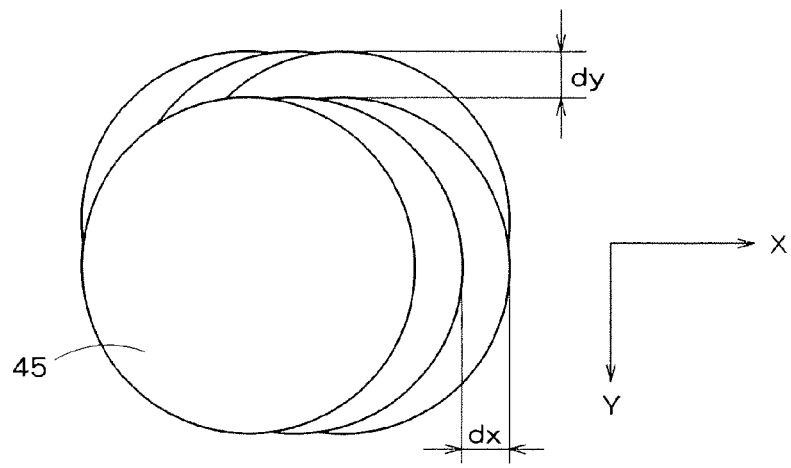
FIG. 7 is a diagram illustrating an irradiation interval between irradiation spots in laser shock hardening.

The characteristic feature of the third embodiment of the present invention resides in the velocity of relative movement between a laser beam and a workpiece. The moving velocity of the laser beam is related to how the laser spot moves on the surface of the workpiece. FIG. 6 shows a distribution of irradiation spots 45 on the surface of the workpiece 41 in laser shock hardening as carried out by the conventional technique. FIG. 7 is a diagram illustrating an irradiation interval between adjacent irradiation spots 45. While moving the irradiation head 17 at a predetermined velocity in the lateral direction in FIGS. 6 and 7 (X direction) by means of the driving device 30, the surface of the workpiece 41 is sequentially irradiated with the laser beam 51 at regular irradiation intervals (dx). When the laser beam 51 has reached the boundary 47 of the processing area, the irradiation head 17 moves in the vertical direction (Y direction) by a predetermined distance (dy), and again moves in the lateral direction (−X direction) while emitting the laser beam 51 sequentially. This laser irradiation procedure is repeated.

In the prior art, the irradiation interval (dx) of the laser beam 51 in the moving direction of the laser beam 51 is made equal to the irradiation interval (dy) of the laser beam 51 in the direction perpendicular to the laser moving direction, so that the surface of the workpiece 41 is irradiated uniformly and regularly with the laser beam 51.

When the repetition of the laser oscillator 11 is increased in order to speed up the laser shock hardening processing, it becomes necessary to move the laser beam 51 at a higher velocity. In particular, the moving velocity (v) of the laser beam can be represented by the following equation, using the irradiation interval (dx) and the repetition (f) of the laser oscillator 11: v=dx·f. The use of a high repetition (f) for speeding up of the processing thus involves the need for an increased moving velocity (v) of the laser beam 51. This involves an increased burden on the driving device 30, imposing a limitation on speeding up of the processing.

Another method conceivable for speeding up the processing is to increase the pulse energy of the laser beam 51 to thereby increase the area processible with one laser beam irradiation. This method, however, entails the problem that when the surface of the workpiece 41 is not flat, local variation (intensity difference) in the peak power density of the laser beam 51 can be produced, making uniform processing difficult. Furthermore, the use of a higher pulse energy requires the use of a larger-sized optical transmission system including a mirror, making laser beam transmission by the optical filter 15 difficult.

According to this embodiment, in order to reduce the burden on the driving device 30 which is an obstacle to speeding up of laser shock hardening, the irradiation interval (dx) of the laser beam 51 in the direction of relative movement between the workpiece 41 and the laser beam 51 is made smaller than the irradiation distance (dy) in the direction perpendicular to the relative movement direction. Thus, the velocity of relative movement between the workpiece 41 and the laser beam 51 is made lower to reduce the burden on the driving device 30. For setting of such movement velocity and control of the driving device 30, the driving device 30 is provided with a control device 31.

Figures 8A, 8B:
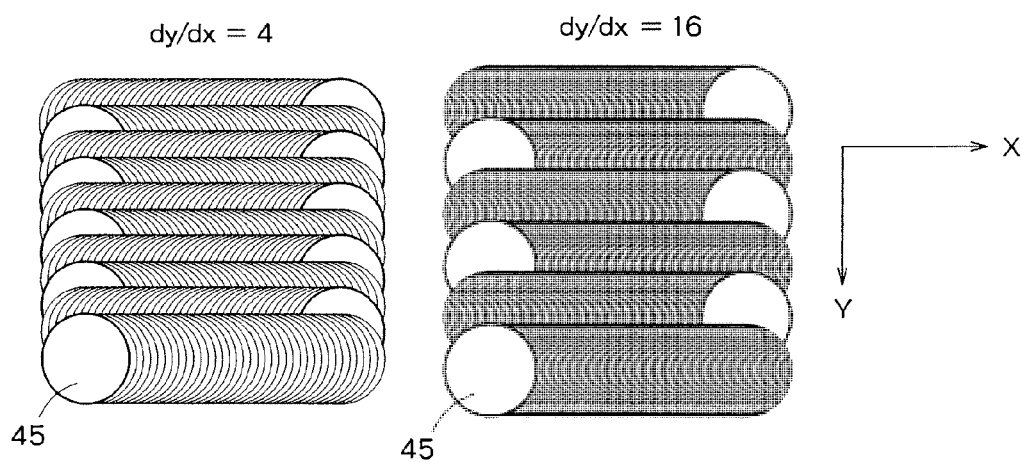
FIGS. 8A and 8B are diagrams illustrating different manners of laser irradiation according to a third embodiment of the present invention.

FIG. 8A shows a distribution of irradiation spots 45 in the case of dy/dx=4, and FIG. 8B shows a distribution of irradiation spots 45 in the case of dy/dx=16. Though the number of pulses of the laser beam 51 applied per unit area is the same as the prior art (FIG. 6), the moving velocity of the laser beam 51 in the X direction becomes ½ (FIG. 8A) and ¼ (FIG. 8B) of that of FIG. 6. Reduction of the burden on the driving device 30 is thus evident.

In order to examine the effect of laser shock hardening according to this embodiment in comparison with the prior art, an experiment was conducted in which the surface of a stainless steel in water was irradiated with a laser beam 51 having a pulse energy of 200 mJ and a pulse width of 8 ns, with 36 pulses being applied per 1 mm², and residual stresses in the surface and the interior of the stainless steel were measured. The laser irradiation was carried out for five different dy/dx rations 1, 4, 16, ¼ and ¹⁄₁₆, and three different diameters of the laser spot 45, 0.6 mm, 0.9 mm and 1.2 mm, were tested for each dy/dx ratio.

It was confirmed by the results of the experiment that the dy/dx ratio has no influence on residual stress. In particular, with the same number of pulses of the laser beam 51 applied per unit area, even a large difference between dx and dy produces no difference in the residual stress distribution.

As illustrated in FIG. 9, as dx is further decreased, with the number of pulses of the laser beam 51 applied per unit area constant, dy increases in inverse proportion thereto and finally becomes larger than the diameter (D) of the irradiation spot 45 of the laser beam 51, resulting in the formation of gaps in the irradiation spots on the processing surface. It has been confirmed experimentally, however, that even under such processing conditions, the residual stress becomes compressive at the surface including gap portions when dy is 5 times D or smaller and thus a sufficient laser shock hardening effect is achieved.

In laser shock hardening, it is necessary to reverse the moving direction of the driving device 30 at both ends of the processing area 46, i.e. at the boundaries 47 of the processing area; and acceleration/deceleration upon the turn in direction is time-consuming. Therefore, the processing speed may not be greatly increased even when the oscillation frequency of the laser oscillator 11 is increased.

FIG. 10 shows the relationship between time and the moving velocity of the driving device 30 when the moving device 30 moves from one boundary of the processing area 46 to the other boundary. The driving device 30, which started accelerating at T1, reaches a predetermined velocity (Vc) at T2 and keeps moving at the velocity, and starts decelerating at T5 and stops at T6. At T3 immediately after the moving device 30 has reached the predetermined velocity (Vc), the shutter 13 of the laser irradiation apparatus 10 is opened for irradiation with the laser beam 51, and the shutter 13 is closed at T4. Next, the driving device 30 moves in the Y direction by the distance dy, and then the driving device 30 and the shutter 13 operate in the same manner as above. The above procedure is repeated to process the processing area 46 sequentially.

Figure 11:
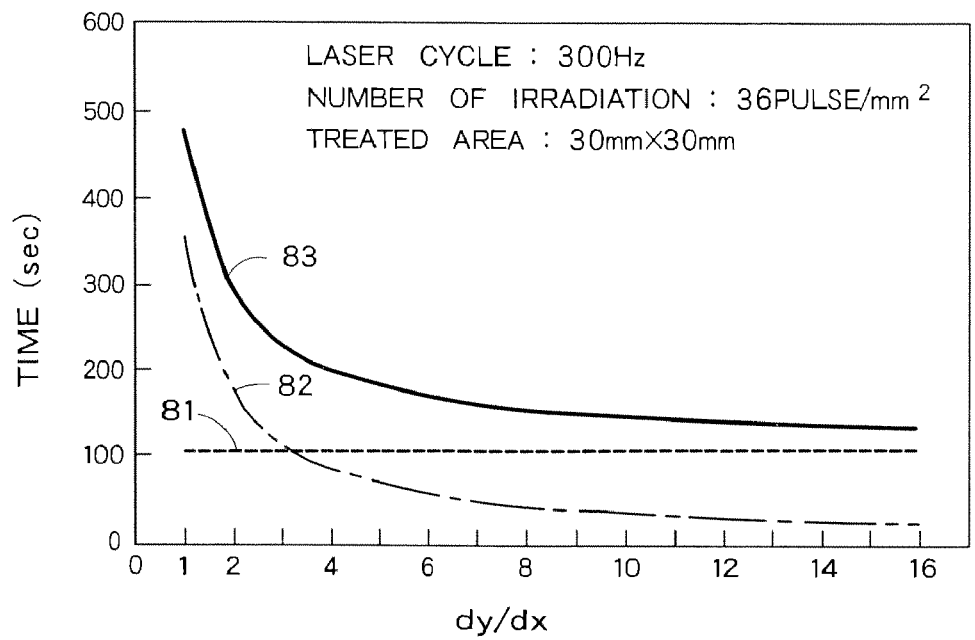
FIG. 11 is a graphical diagram illustrating a processing speed of laser shock hardening according to the third embodiment of the present invention.

FIG. 11 shows the results of determination of the relation between processing time 83 and dy/dx in laser shock hardening as carried out in the above manner. The determination was made under the conditions of: the repetition of the laser oscillator, 300 Hz; the number of pulses applied per 1 mm², 36 pulses; the dimensions of the processing area 46, 30 mm×30 mm; acceleration during acceleration/deceleration of the driving device 30, 50 mm/S²; and the range of each acceleration/deceleration area, 3 mm. The processing time 83 includes laser beam irradiation time 81, acceleration/deceleration time 82 and Y-direction movement time.

In the case of carrying out processing according to the prior art, i.e. with dy/dx=1, the processing time 83 is about 480 seconds about 80% of which is spent on the movement of the apparatus. In the case of carrying out processing with dy/dx=4 according to the present invention, on the other hand, the processing time 83 is about 210 seconds which are almost equally divided into the laser beam irradiation time 81 and the acceleration/deceleration time 82. The processing 83 can be shortened to about 140 seconds by carrying out processing with dy/dx=16.

As described hereinabove, by making the velocity of relative movement between the workpiece 41 and the laser beam 51 low according to the present invention, the burden on the driving device 30 can be reduced even when the repetition of the laser oscillator 11 is increased to speed up laser hardening processing.

Especially in carrying out laser shock hardening of e.g. an in-use large-sized structure by irradiating it with the laser beam 51 while moving the irradiation head 17, the moving velocity of the irradiation head 17 can be made low according to the present invention. This makes it possible to use a smaller-sized lightweight driving device 30. Therefore, even in case of an accidental collision, for example due to an operational error, damage to the structure and to the driving device 30 can be reduced.

In laser shock hardening of a workpiece in a narrow space, for example, a structure in a nuclear reactor, there is a case in which it is difficult to process the entire processing area 46 with one type of driving device 30 or a case in which the entire processing area 46 is not accessible from one direction, but only accessible by a plurality of routes. In such a case, processing is generally carried out in a divisional manner, with overlapped processing between divided processing areas being carried out. When processing a smaller processing area 46 as in this case, the acceleration/deceleration time 82 of the driving device 30 relative to the laser beam irradiation time 81 becomes longer, leading to less efficient processing. The present invention is especially useful for such processing.

<Fourth Embodiment>

Figure 12:
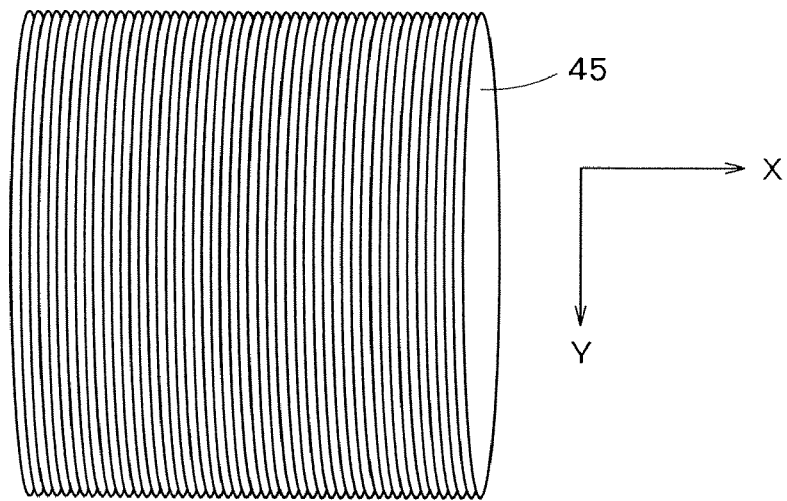
FIG. 12 is a diagram illustrating the shape of an irradiation spot and a manner of laser irradiation according to a fourth embodiment of the present invention.

FIG. 12 is an explanatory diagram illustrating a laser shock hardening method according to a fourth embodiment of the present invention. The apparatus shown in FIG. 4 can be used for the laser shock hardening method of this embodiment. Thus, the same members or elements as those of the first embodiment are designated with the same reference numerals and a duplicate description thereof will be omitted.

According to the above-described third embodiment, by making the irradiation interval (dx) of the laser beam 51 in the direction of relative movement between the workpiece 41 and the laser beam 51 smaller than the irradiation interval (dy) in the direction perpendicularly to the direction of the relative movement, the moving velocity of the irradiation head 17 and the driving device 30 can be decreased. This enables reduction of the burden on the driving device 30 and speeding up of laser shock hardening processing.

As described above with reference to FIG. 9, however, when the moving velocity of the laser beam 51 is made extremely low, the interval (dy) between irradiation spots 45 in the Y direction becomes larger than the diameter (D) of the irradiation spot 45, resulting in the formation of gaps, i.e. unprocessed portions, in the irradiation spots in the processing area 46. Though a sufficient laser shock hardening effect may be achieved when the gap is 4 times the diameter (D) of the irradiation spot 45 or smaller, i.e. when dy is 5 times D or smaller, as described above, the effect can vary in places.

According to the fourth embodiment, the irradiation spot 45 of the laser beam 51 on the surface of the workpiece 41 is formed in an elongate shape as shown in FIG. 12, and the laser beam 51 is moved in the direction (X direction in FIG. 12) perpendicular to the long direction of the irradiation spot 45. This makes it possible to reduce the burden on the driving device 30 and further increase the processing speed and to effect laser shock hardening without processing variation.

In accordance with the irradiation manner as illustrated in FIG. 12, a laser beam of a pulse energy of 200 mJ and a pulse width of 8 ns was collected by a cylindrical convex lens so that the irradiation spot takes the shape of an ellipse having a major axis of 9.25 mm and a minor axis of 0.2 mm and applied on the surface of a stainless steel at 36 pulses per 1 mm². The residual stress at the surface after processing was compressive, −645 MPa, and the residual stress had been changed from tensile to compressive in the region to the depth of about 1 mm from the surface. The residual stress improvement effect is similar to that shown in FIG. 3. The moving velocity of the laser beam 51 and thus of the driving device 30 was 0.9 mm/s.

Table 1 shows comparison of the moving velocity of the laser beam 51 according to the fourth embodiment with those of the prior art and the third embodiment. According to the fourth embodiment, the moving velocity of the laser beam 51 and thus of the driving device 30 is about ⅟₅₆ of that of the prior art (dy/dx=1), and is ½₈ (dy/dx=4) or ¹⁄₁₄ (dy/dx=16) of that of the third embodiment. Thus, the fourth embodiment of the present invention, while enjoying the same residual stress improvement effect, can materially reduce the burden on the driving device 30.

TABLE 1

| Shape and size of Irradiation spot | | dy/dx | Moving velocity | Remarks | Processing conditions |
|---|---|---|---|---|---|
| Circle | 0.8 | 1 | 50 mm/s | Prior art, FIG. 6 | Laser repetition: 300 Hz |
| | 0.8 | 4 | 25 mm/s | The present invention, FIG. 8A | Number of pulses applied: 36 pulses/mm² |
| | 0.8 | 16 | 12.5 | The present invention, FIG. 8B | |
| Ellipse | 9.25 × 0.2 | | 0.9 | The present invention, FIG. 12 | |

When processing e.g. a heat-affected zone of a large-sized structure according to the fourth embodiment of the present invention, the intended processing can be completed by shaping the laser beam 51 into an elliptical irradiation spot of a length of about 10 mm and moving the laser beam along a weld line. In the prior art the movement of the laser beam 51 is two-dimensional, and the stop (deceleration) operation and the start (acceleration) operation of the driving device 30 are each necessary each time the laser beam 51 reaches the boundary 47 of the processing area. According to the present invention of this embodiment, on the other hand, such operations are necessary each only once in the above processing, leading to speeding up of the processing and enhanced durability of the driving device 30.

Furthermore, in the prior art the shape of irradiation spot 45 is a circle, for example having a diameter of 1 mm and, therefore, precision of the order of ±0.1 mm is required in the movement of the driving device 30 in the Y direction. On the other hand, when carrying out processing with an elliptical irradiation spot 45, for example having a major axis of 10 mm, according to the present invention of this embodiment, precision of the order of ±1 mm will suffice for the movement of the driving device 30 in the Y direction if such movement is necessary. This materially increases design freedom for the driving device 30.

<Fifth Embodiment>

FIG. 13 is an explanatory diagram illustrating a laser shock processing apparatus according to a fifth embodiment of the present invention. The apparatus can be used for carrying out the above-described laser shock hardening method of the fourth embodiment. The same members or elements as those of FIG. 1 are designated with the same reference numerals and a duplicate description thereof will be omitted.

The pulsed laser beam 51, emitted from the laser oscillator 11, passes through the power adjustment device 12, the shutter 13, a beam expander 91 and a mirror 92 and enters the irradiation head 17 having a cylindrical convex lens 93. The beam expander 91 functions to increase or decrease the size of the laser beam 51 so as to adjust the size of the laser beam 51 entering the irradiation head 17.

Figure 14:
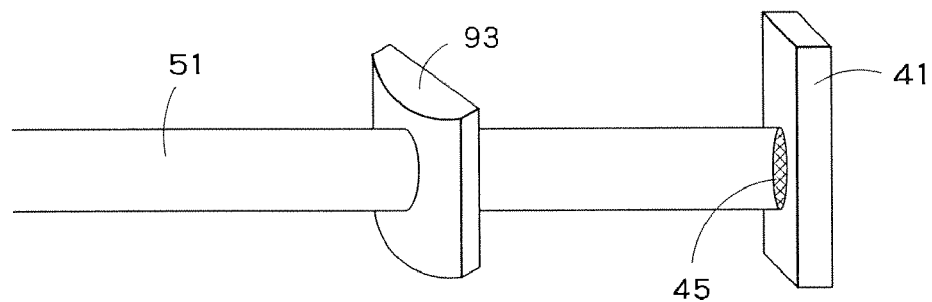
FIG. 14 is a diagram illustrating the function of a cylindrical convex lens.

FIG. 14 is an explanatory diagram conceptually illustrating the function of the cylindrical convex lens 93 in this embodiment. The cylindrical convex lens 93 is disposed such that its axis is generally orthogonal to the laser beam 51. When the laser beam 51 entering the cylindrical convex lens 93 has a circular vertical section, the cross section of the laser beam 51 becomes elliptical on passing through the cylindrical convex lens 93, and the irradiation spot 45 on the surface of the workpiece 41 has the shape of an elongate ellipse.

In this embodiment the surface of the workpiece 41 is laser shock hardening-processed by moving a movable mirror 94 and the irradiation head 17 at a predetermined velocity by means of the driving device 30. Upon the processing, the size of the irradiation spot 45 in the long direction can be adjusted with the beam expander 91. If necessary, the movable mirror 94 and the irradiation head 17 may be moved two-dimensionally in a horizontal plane, or the workpiece 41 may be moved by using the position adjustment function of the holder 42, whereby processing of a wider area can be carried out.

In this embodiment shown in FIGS. 13 and 14, the processing efficiency is highest when the driving device 30 is moved in the direction perpendicular to the long direction of the elliptical irradiation spot 45. Accordingly, when setting a desired moving direction of the driving device 30, the cylindrical convex lens 93 may be rotated while keeping it coaxial with the laser beam 51 so as to carry out efficient processing.

Figure 15:
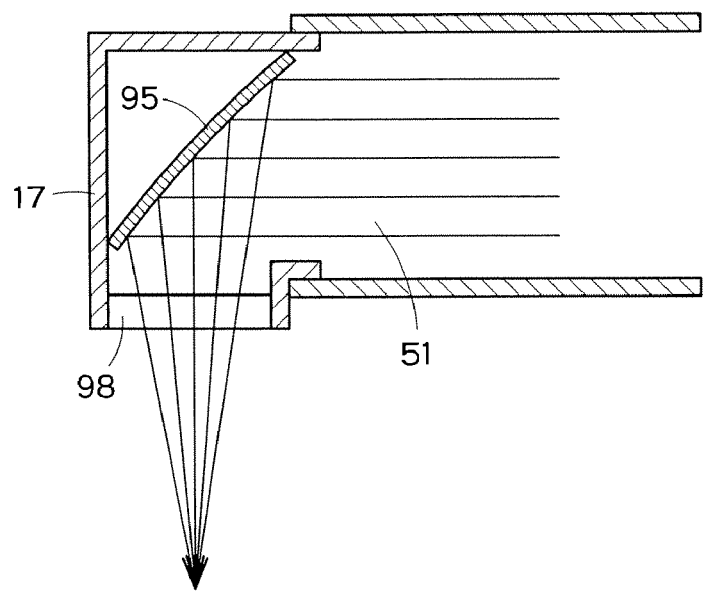
FIG. 15 is a cross-sectional diagram illustrating an irradiation head using a cylindrical concave mirror, and its function.

FIG. 15 is a diagram illustrating the concept of the present invention in the case of using a cylindrical concave mirror 95 instead of the cylindrical convex lens 93. The cylindrical concave mirror 95 has such a shape that the line of intersection with a plane parallel to the paper is part of a parabola and the line of intersection with a plane vertical to the paper is a straight line. Since an incident laser beam 51 parallel to the axis of a parabola is reflected such that it is brought to the focus, the use of the cylindrical concave mirror 95 can achieve the same effect as the use of the cylindrical convex lens 93 (FIG. 14).

FIGS. 16A and 16B are conceptual diagrams illustrating a manner of processing the surface of the workpiece 41 more uniformly according to this embodiment, both schematically showing the irradiation head 17 provided with a homogenizer 97, as viewed from 90-degree different directions. As shown in FIG. 16A, the homogenizer 97 is an optical component in the shape of an obtuse-angled prism, and is so designed that the right half and the left half of the incident laser beam 51 will overlap each other in the irradiation spot 45.

FIG. 17 shows an intensity distribution of the laser beam 51 in the irradiation spot 45 as obtained by using the irradiation head 17 having the homogenizer 97, together with a comparative intensity distribution as obtained by using the irradiation head 17 without a homogenizer. In FIG. 17, the abscissa denotes position in the irradiation spot 45, and the ordinate denotes the peak power density (relative density). As apparent from the comparative data, the provision of the homogenizer 97 can equalize the intensity distribution in the irradiation spot 45, providing a generally-flat intensity distribution.

Though in this embodiment the homogenizer 97 is disposed before (on the laser oscillator side) the cylindrical convex lens 93, the same effect can be obtained if the homogenizer 97 is disposed after the lens 93. Further, instead of the use as the homogenizer 97 of an optical component in the shape of an obtuse-angled prism, it is also possible to use a kaleidoscope, a microlens array, etc.

<Sixth Embodiment>

FIG. 18 is an explanatory diagram illustrating an irradiation head for use in a laser shock hardening apparatus according to a sixth embodiment of the present invention. The irradiation head is used in place of the irradiation head 17 of the laser shock hardening apparatus of FIG. 1. The same members or elements as those of FIG. 1 are designated with the same reference numerals and a duplicate description thereof will be omitted.

A workpiece 41 for use in this embodiment may be exemplified by the inner surface of a small-bore pipe. The irradiation head 17 is set generally coaxially with a tubular workpiece 41 by means of a not-shown positioning jig. The laser beam 51 emitted from the laser oscillator 11 is transmitted by the mirror 92, etc. and enters the lens 16 set inside the irradiation head 17. The laser beam 51 which has passed through the lens 16 is gradually collected and reflected by a conical mirror 96 at an angle of approximately 90 degrees to become a radial laser beam 51, and the radial laser beam 51 is applied to the inner surface of the tubular workpiece 41. Reference numeral 98 denotes a cylindrical entrance window composed of a solid transparent to the wavelength of the laser. Of course, the laser light path between the entrance window 98 and the workpiece 41 is filled with a liquid.

When the focal length of the lens 16 is made almost equal to the optical distance between the lens 16 and the workpiece 41 by adjusting the focal length of the lens 16 or the setting position of the lens 16, the irradiation spot 45 on the surface of the workpiece 41 has the shape of a narrow ring. The inner surface of the tubular workpiece 41 can be processed by irradiating the surface with such irradiation spot 45 of the laser beam 51 while moving the irradiation head 17 in the axial direction of the tubular workpiece 41.

In the case of processing the inner surface of the tubular workpiece 41 by the conventional technique, the laser beam 51 is emitted from the irradiation head 17 while rotating the irradiation head 17 at a high speed and, at the same time, the irradiation head 17 is continuously moved in the axial direction of the tubular workpiece 17, so that the inner surface is irradiated with the laser beam 51 in a spiral manner. The conventional method thus necessitate the provision of a rotary sliding means, making the driving device 30 complicated. Furthermore, the conventional method involves a high operation speed of the driving device 30 and thus a heavy burden on it, imposing a limitation on speeding up of the processing.

According to this embodiment, on the other hand, the laser beam 51 is emitted radially whereby a simultaneous 360-degree processing can be carried out without rotating the irradiation head 17. There is, therefore, no need for high-speed rotational operation of the irradiation head 17 and thus no need for a rotational sliding means. This can materially simplify the construction of the driving device 30 and can remarkably increase the processing speed.

Though in this embodiment the lens 16 is used in combination with the conical mirror 96 to form the radial laser beam 51, the same radial laser beam can also be formed by using a concave mirror, instead of the lens 16, in combination with the conical mirror 96.

When the slope of the conical mirror 96 has such a shape that the line of intersection of the slope with a plane including the axis of the mirror 96 is part of a parabola, the incident laser beam 51 parallel to the axis can be brought to the focus of the parabola and, therefore, the lens 16 becomes unnecessary.

What is claimed is:

1. A laser shock hardening method for carrying out surface processing of a workpiece in contact with a liquid by irradiating through the liquid the surface of the workpiece with a pulsed laser beam intermittently emitted from a laser irradiation device, the method comprising:

setting a velocity of relative movement between the laser beam and the workpiece so that an irradiation interval (dx) of the laser beam defined by a moving distance of the laser spot in a first direction when the laser beam is emitted two times differs from an irradiation interval (dy) in a second direction perpendicular to the first direction;

irradiating through the liquid the surface of the workpiece with the pulsed laser beam emitted intermittently from the laser irradiation device, while moving laser spots of the laser beam in the first direction by the irradiation interval (dx) on a processing area of the surface of the workpiece;

moving the laser spots of the laser beam in the second direction by the irradiation interval (dy) on the processing area after completion of the move in the first direction; and irradiating through the liquid the surface of the workpiece with the pulsed laser beam emitted intermittently from the laser irradiation device, while moving laser spots of the laser beam in a reverse direction of the first direction by the irradiation interval (dx) on the processing area, thereby shock-hardening the surface of the workpiece.

2. The laser shock hardening method according to claim 1, wherein the irradiation interval (dx) of the laser beam applied to the surface of the workpiece is smaller than the irradiation interval (dy) in the second direction perpendicular to the first direction.

* * * * *